United States Patent
Bogen et al.

Patent Number: 5,815,147
Date of Patent: Sep. 29, 1998

[54] VIRTUAL PLAY ENVIRONMENT FOR DISABLED CHILDREN

[75] Inventors: Daniel K. Bogen, Swarthmore; Kirk A. Reinbold, Phoenixville, both of Pa.

[73] Assignee: The Trustees of the University of Pennsylvania, Philadelphia, Pa.

[21] Appl. No.: 659,996

[22] Filed: Jun. 7, 1996

[51] Int. Cl.⁶ .................................................. G06F 15/00
[52] U.S. Cl. ................................................................ 345/334
[58] Field of Search .................................... 345/334, 473, 345/474, 121, 333

[56] References Cited

U.S. PATENT DOCUMENTS

| | | | |
|---|---|---|---|
| 5,322,441 | 6/1994 | Lewis et al. | 345/474 |
| 5,425,139 | 6/1995 | Williams et al. | 395/152 |

*Primary Examiner*—Phu K. Nguyen
*Attorney, Agent, or Firm*—Dann, Dorfman, Herrell and Skillman, P.C.

[57] ABSTRACT

A system for providing a virtual play environment to assist children with physical and/or cognitive impairments is described. The system includes a central processing unit, a selection device connected with the central processing unit, a computer memory connected with the central processing unit for storing object definitions and operational rules, and a visual display device connected with the central processing unit for displaying a visual image of a defined object and the actions of the defined object when it is selected by the user. Each object definition includes a plurality of attributes, such as an encoded visual image of a physical object, a binding variable for indicating whether the object is bindable to a second object, a moveability variable for indicating whether the object is moveable within the play environment, a list of other objects with which an object is bindable, a selectability variable for indicating whether the object is selectable for an activity, and instructions defining an action procedure to be followed by the central processing unit when the object is selected. The operational rules define a sequence of steps to be performed by the central processing unit to effect actions of defined objects in response to the selection device.

1 Claim, 7 Drawing Sheets

VIRTUAL PLAY ENVIRONMENT FOR DISABLED CHILDREN

Pursuant to 35 U.S.C. §202(c), it is hereby acknowledged that the U.S. Government has certain rights in the invention described herein, which was made in part with funds from the National Institute of Health, Grant Number 5T32HD07425.

FIELD OF THE INVENTION

The present invention relates to a virtual play environment for allowing disabled children to engage in cognitive skill-developing play activity. In particular, the invention relates to a computer system for providing a virtual doll house in which children may engage in non-goal-oriented narrative or expressive activity.

BACKGROUND OF THE INVENTION

The main purposeful activity undertaken by young children is play. From a developmental perspective, play is often considered as practice for the child's later roles in life. Through play a child can explore the environment and gain knowledge regarding the physical laws governing objects, socialize with adults and peers to gain important interpersonal skills, and use his or her imagination and begin honing the pathways for conscious thought. Thus, it can be argued that play in humans is a tool leading to perceptual, conceptual, intellectual and language development, the basic building blocks required for the formulation of higher cognitive functions.

For healthy children in very early childhood play is either oriented toward physical objects or toward symbol manipulation. Meaningful verbalizations are not yet possible. However, eventually through play, the child begins to attach specific names to objects. Soon afterwards, more complex sentences are learned and the child talks to himself or herself in order to achieve specific activities. Meaningful self-speech, when activity and verbalization merge and the child can say what he or she is doing, is believed to be a significant point in intellectual development. Self-speech is eventually made non-verbal, and we talk ourselves through specific activities. This is often referred to as self-reflective activity and occurs throughout childhood and even adulthood. For self-reflective activity to occur, one must be able to recall and manipulate specific memory events. The brain system that this refers to is working memory which is theorized to have both a verbal/language component, the phonological loop, and a visual imagery component, the visuospatial sketch pad.

A child who has a disability may be impaired or prevented from engaging in play activity. Such impairment may cause a secondary disability by delaying intellectual development. It is therefore crucial to provide play in the lives of disabled children. This is no easy task because "normal" play may be extremely difficult. A neuromotor deficit may make it impossible to physically manipulate small toys developed for non-disabled children, such as dolls or building blocks, and may lead to anxiety, frustration and depression. A neurologic disability which impedes cognitive functioning may lead to the inability to communicate effectively with adults and age related peers. This can be extremely detrimental since some adults, or especially peers, may not attempt an interaction, or even worse, may shun or mock the disabled child. This causes withdrawal from society and makes the child that much more dependent upon his or her parents and family for support.

It would be advantageous to provide a virtual play environment for certain disabled children. Such play would be advantageous for several reasons: developmental milestones may be achieved more quickly; the child may learn to distinguish between images and scenes created from multiple images; and it may give the child a vehicle for self-reflective activity and thus be a seed for the development of imagination, consciousness, and communication.

SUMMARY OF THE INVENTION

A system according to the present invention meets the aforesaid objectives by providing a virtual play environment to assist children with physical and/or cognitive impairments. The system includes a central processing unit, a selection device connected with the central processing unit, a computer memory connected with the central processing unit for storing object definitions and operational rules, and a visual display device connected with the central processing unit for displaying a visual image of a defined object and the actions of the defined object when it is selected by the user. Each object definition includes a plurality of attributes, such as an encoded visual image of a physical object, a binding variable for indicating whether the object is bindable to a second object, a moveability variable for indicating whether the object is moveable within the play environment, a list of other objects with which an object is bindable, a selectability variable for indicating whether the object is selectable for an activity, and instructions defining an action procedure to be followed by the central processing unit when the object is selected. The operational rules define a sequence of steps to be performed by the central processing unit to effect actions of defined objects in response to the selection device.

BRIEF DESCRIPTION OF THE DRAWINGS

The foregoing summary as well as the following detailed description of the preferred embodiments of the present invention will be better understood when read in conjunction with the appended drawings, in which.

DETAILED DESCRIPTION OF THE PREFERRED EMBODIMENTS

Figure 1:
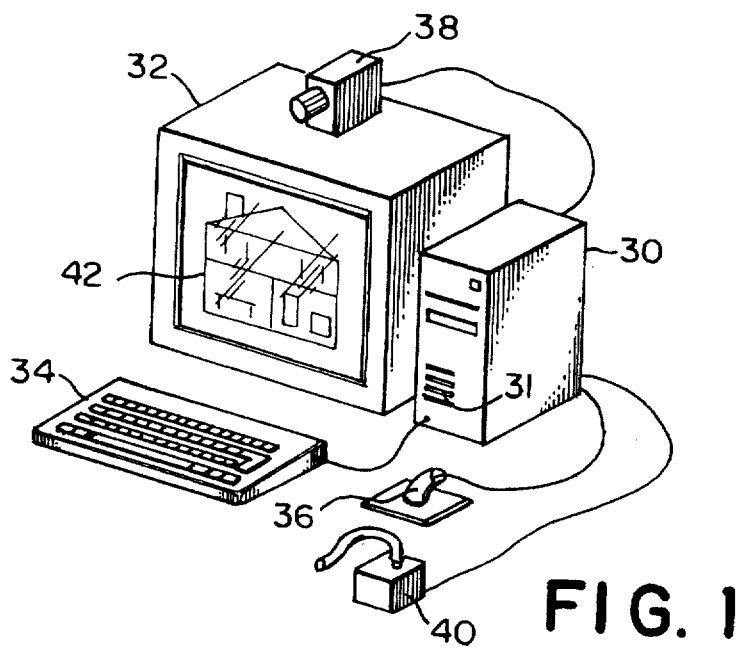
FIG. 1 is a perspective view of a system for providing a virtual play environment in accordance with the present invention.

Referring now to FIG. 1, there is shown a system for providing a non-directed play environment for a disabled child. The system comprises a general-purpose programmable computer, such as a personal computer 30, a visual display device 32, and appropriate input/output devices such as a speaker 31, a keyboard 34, a mouse 36, a video camera 38, and a single switch input device such as a sip-and-puff switch 40. Depending upon the nature or severity of the user's disability, either the keyboard, mouse, or sip-and-puff switch may be employed as the primary means for selecting and manipulating objects shown on the display. In the preferred embodiment, the computer 30 is programmed to provide the non-directed play environment in the form of a doll house 42 shown on the display device 32.

In the embodiment shown, the computer 30 generates a display of graphical objects and scenes which can be manipulated through an interface appropriate for a disabled user. The graphical objects are representations of physical objects typically found in a child's toy doll house, including dolls, clothing, furniture, household objects and appliances, as well as a house. The objects are moved on the computer screen by means of the mouse 36 or single-switch input device 40. The movements of the objects are governed by specific rules. The rules govern: (1) the allowed positions of the objects within the computer doll house, according to how the objects are typically observed in the real world; (2) the allowed positions of objects in relation to one another, again, according to how the objects are typically observed in the real world; (3) object interaction within the computer-generated doll house based upon previous movements and arrangements of the objects; (4) rearrangement of object positions and sizes to simplify cognitive and physical interaction with the interface; (5) the attachment of one object to another; (6) situations in which objects jump positions in order to attach to their intended target objects; and (7) generation of sound and voice, including speech generation based upon scene interpretation.

Figure 2:
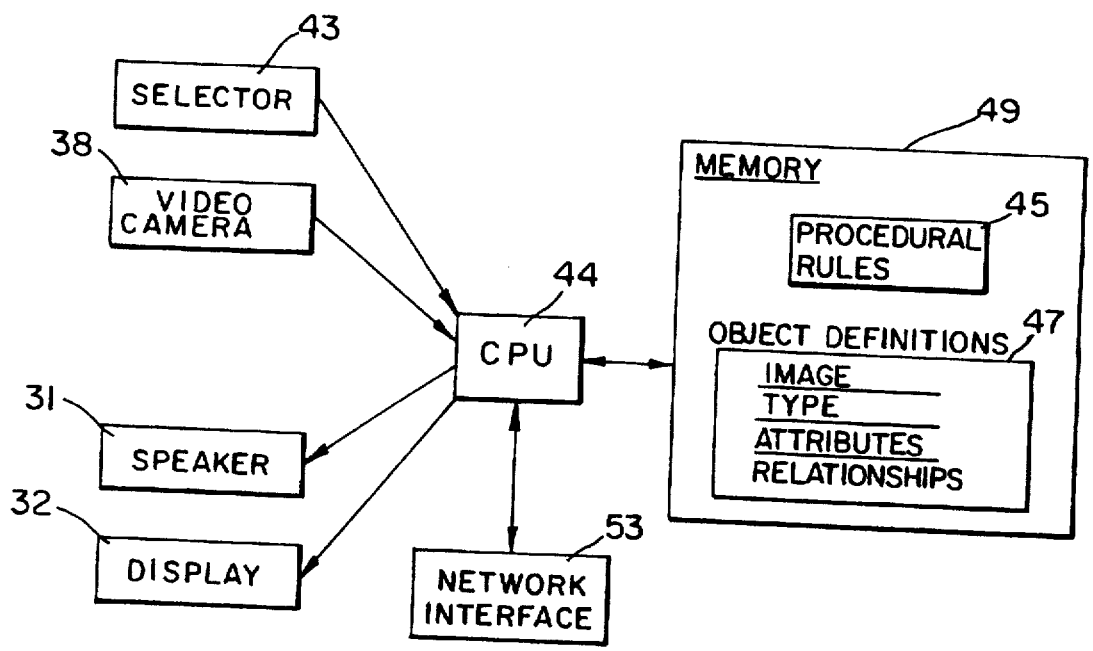
FIG. 2 is a functional block diagram of the system of FIG. 1.

The system is functionally configured as shown in FIG. 2. The computer 30 has a CPU 44 that coordinates the display of objects within the doll house in response to signals from the selector device 43 and in accordance with a set of operational rules 45 and object definitions 47 stored in a random-access memory 49 that is connected with the CPU 44. The objects used in the system and the operational rules associated therewith are defined, using an appropriate object-oriented programming language such as FLEX or PROLOG, as an instance of an object class, or grandfather object. As shown in FIG. 2, the object definitions 47 include information and variables such as an associated object image, an object classification type or hierarchy, a set of variable attributes, and a set of variable relationships stored within the memory 49 of the computer.

Classes of objects represent, for example, the house itself, people, furniture, food, background objects, and miscellaneous objects. Each class is initially defined to have default attributes of selectability, selected action (hereinafter the ON_SELECT action), movability, bindability, and, if an object in a class is bindable, binding site(s) for that object. Each object is defined to the system by specifying the class of the object, a pointer to an image of the object (e.g., a bitmap or a procedure for drawing the object), non-default attributes of the object, and the initial relationships of the object to other objects. Such relationships include, for example, binding relationships and/or storage relationships.

Every image on the screen is classified as an object in accordance with a parent-child-grandchild hierarchy, the classification "object" being the parent category. Objects are further subdivided into child categories of general types of objects, for example, background objects, furniture, people, food, and miscellaneous objects. The child category is further divided into a grandchild category containing the specific objects that will be manipulated within the Doll House. Examples of grandchild objects include "table" and "closet" which are furniture, and "dressed doll" and "sleeping doll" which are people.

Attributes are assigned to child objects to define what action can be done upon, by, or with that object. For instance, furniture generally does not move, so one attribute of furniture is unmovability. In contrast, an attribute of people is movability because people are moveable. The attributes of the grandchild objects are inherited from the child objects and may or may not be altered to fit the object or the circumstances of the object. For example, both a table and a closet are furniture and so are unmovable. However, upon selecting the table nothing occurs, whereas upon selecting the closet it opens. This is coded the following way: "table: selectability is false"; "closet: selectability is true and if_selected then open."

The computer doll house employs binding sites for determining the locations at which objects can be attached to one another. In an analogy to biological molecules, which can attach to each other only at certain locations and only when the molecules have corresponding chemical characteristics, objects in the computer doll house can attach to each other only at certain locations and only when the objects have corresponding attributes. For example, in the computer doll house, heads, closet shelves, and hat racks have binding sites for hats; hence, hats can be attached to heads, closet shelves, or hat racks. Attaching a hat to an object that does not bind with a hat is not allowed. The use of binding sites allows the computer doll house to assist the user in arranging objects. When a first object is moved toward another object (the target) which has a binding site for the first object, the first object will automatically bind, or "snap" to the target. Once bound, the object can be removed only if there is another position (binding site) where it can go, or if another object is moved to bind at the same site. In the latter case, the first-bound object is released and returned to its previous or default location.

Relationships between objects define how certain objects interact with other objects. For example, food and clothing are bindable to people, but not the other way around. This unidirectional relationship actually behaves as a rule because in the computer doll house, food and clothing must be brought to the doll. Alternatively, bi-directional binding relationships may also be defined.

Figure 4:
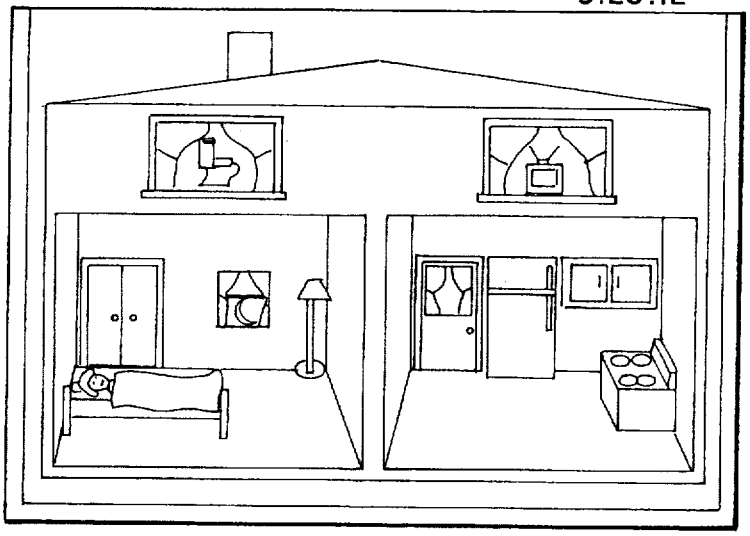
FIGS. 4–7, 8A–8D, 9–13, 14A–14B, and 15–16 are reproductions of screen displays of several scenes generated by the system of FIG. 1.

Referring now to FIG. 4, there is shown an initial screen display essentially as it would be presented to the user by the system. The top left window represents the bathroom and the top right window represents the living room. The bottom left room is the bedroom and the bottom right room is the kitchen. Background objects shown on the display include the house or parts thereof, such as the rooms or the walls of the rooms. Background objects have default attributes of being neither selectable nor bindable, and hence have no defined action attributes or binding sites. Background objects have images stored in memory to provide appropriate scenes upon which images of other objects may be superimposed.

A background object in FIG. 4 includes, for example, a darkened bedroom. Furniture objects shown in the bedroom background object of FIG. 4 include a bed, a closet, and a lamp. The default attributes of furniture objects are identical to those of background objects, but certain instances of the furniture class are defined to have non-default attributes. The bed object, for example, is bindable with the sleeping doll object, and has a binding site for the sleeping doll object on the upper surface of the image of the bed. The bed object is selectable, and has the action attribute of reclining the sleeping doll object upon the surface of the bed. The lamp object is selectable, and has the action attribute of replacing the darkened room object with a lighted room object when the lamp object is selected. The closet object is also selectable. It contains clothing objects and has a selectable action of opening to allow the user to select articles of clothing from within the closet.

Figure 3:
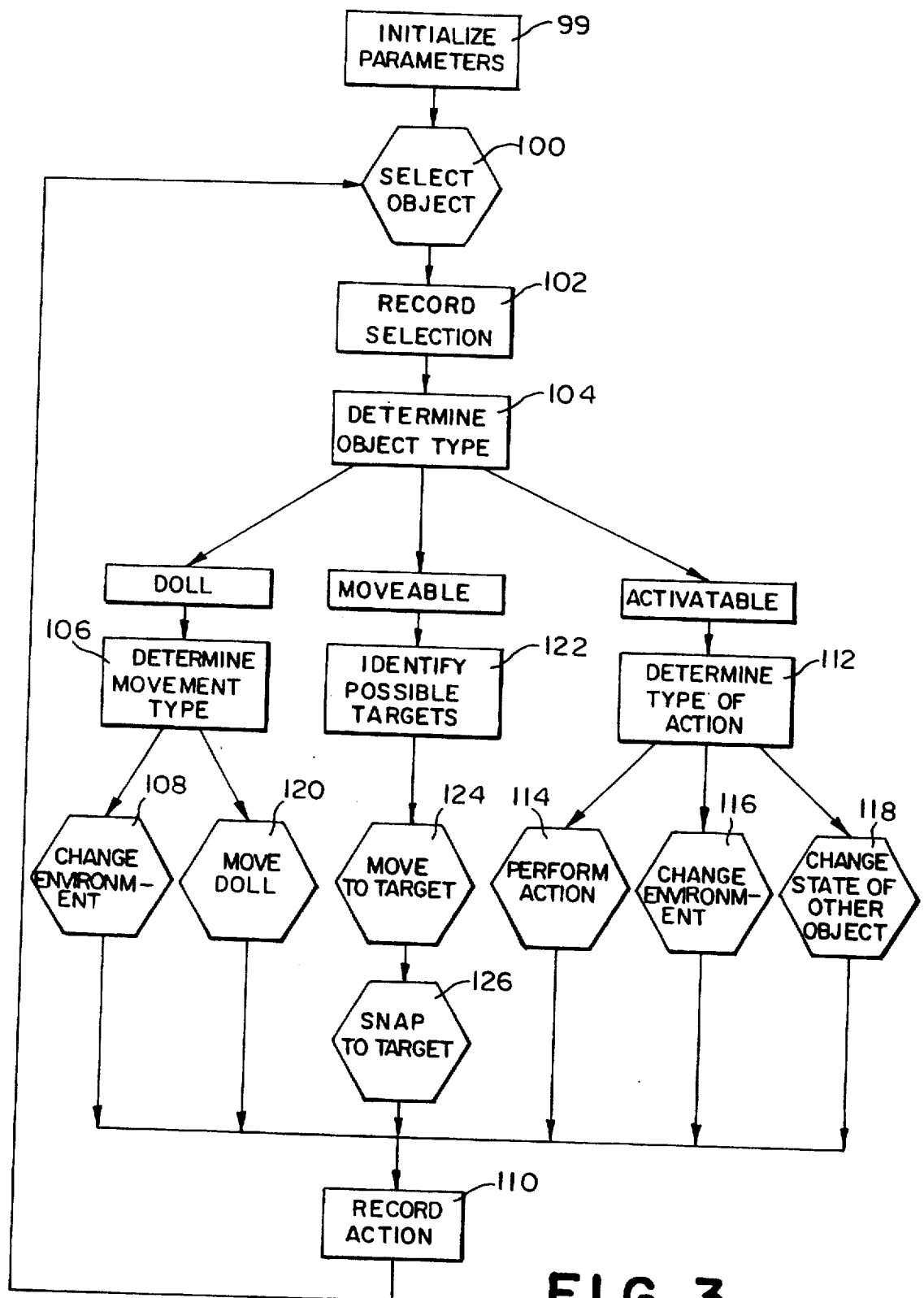
FIG. 3 is a logical flow diagram of a procedure followed by the system of FIG. 1.

Referring now to FIG. 3, there is shown a flow diagram of an event loop defined by the operational rules stored in the random access memory 49 for defining the manner in which the CPU 44 manipulates an object in response to user input from the selection device during operation of the system. As such, a computer-controlled method is provided.

Beginning at step 99, the user is prompted to provide several parameters that will guide operation of the system. For example, the user may specify the selection device to be employed, the desired gender of the doll, the initial doll house scenario, and other data relevant to desired operating conditions. The CPU 44 then proceeds to step 100.

At step 100, the CPU executes an object selection routine defined by the operational rules. In applications where the user is profoundly disabled, the selector is a binary switch input device, such as the sip-and-puff switch 40. Such a selection device is not as readily used to select objects in a "point-and-click" manner, as with a mouse. Hence, in order to select objects for manipulation when such a device is employed, the object selection procedure includes a scan procedure having a set of instructions for highlighting or otherwise indicating that successive objects within a scene are selectable. In order to select an object within a scene, the user then activates the selector during the time interval that the desired object is highlighted during the scan procedure. In the exemplary embodiment, the selection procedure will cause the display to cycle through the selectable objects in the portion of the scene, e.g. the room, where the doll is located. Further, the selectability of objects can be conditioned on the status of the doll, i.e., where it is in the house and the last action to which it was subject.

For example, in the display shown in FIG. 4, the doll is sleeping in the bed in the bedroom. In this scene it is night and both the lights in the bedroom and kitchen are turned off and the window in the bedroom displays a night time scene. When the doll is sleeping, the selectability of other objects in the room is conditionally negated. The only object that can be selected here is the doll that is sleeping. When the sleeping doll is selected, the CPU 44 advances through the event loop from the selection procedure in step 100 to step 102, wherein the selection is recorded in a chronological record of the play session. Additionally, in step 102, a pre-recorded message, such as "the doll is asleep" may be announced to the user by the system. Alternatively, a text-to-speech generator may be used to generate audible messages in response to selected actions or scenes produced during a play session. After a selection is recorded or announced, the CPU 44 proceeds from step 102 to step 104.

Figure 5:
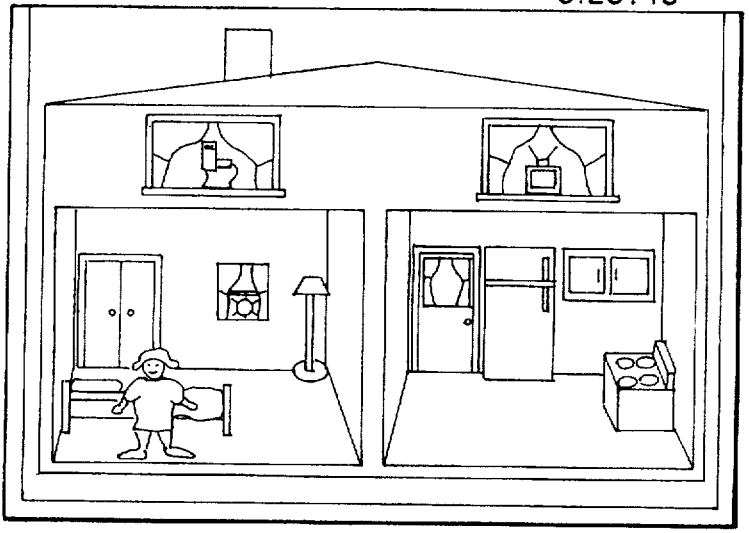

In step 104, the CPU 44 determines, from the definition of the selected object, the type of the object and hence the defined actions that may result from selecting the object. Continuing with the present example wherein the selected object is the doll object, the CPU branches to step 106 to determine the defined ON_SELECT action of the selected doll object. The ON_SELECT action of the doll object is defined as an action which allows movement of the doll or alteration of the doll's environment depending on the most current state of the doll object. For example, the ON_SELECT action of the sleeping doll object is defined to alter the environment in which the sleeping doll object is located, whereas the ON_SELECT action of an awake doll is defined to allow movement of the doll. In the present example, selection of the sleeping doll causes the CPU 44 to proceed to step 108 in order to alter the environment of the doll. In particular, selection of the sleeping doll is defined to terminate the display of the sleeping doll, invoke an awake doll object, and to similarly replace the background objects within the bedroom such that the bedroom becomes bright and the window in the bedroom displays a day time scene, as shown in FIG. 5.

Invocation of the awake doll object may be accompanied by alternating the conditional selectability of other objects in the room. For example, when the awake doll object is invoked in the bedroom, the selectability of the bed, the lamp, and the closet are switched to being selectable. The ON_SELECT action of the unmade bed may be defined as to replace the unmade bed object with a made bed object. The ON_SELECT action of the lamp may be defined as to replace the darkened lamp object with a lamp object that is a brighter shade or color. After performing the defined actions of step 108, the CPU 44 then proceeds to step 110.

In step 110, the CPU 44 records the completed action in the chronological record, and may also play back an appropriate recorded message to the user, such as the greeting "good morning" in the present example. The CPU 44 then returns to the object selection step 100.

Figure 6:
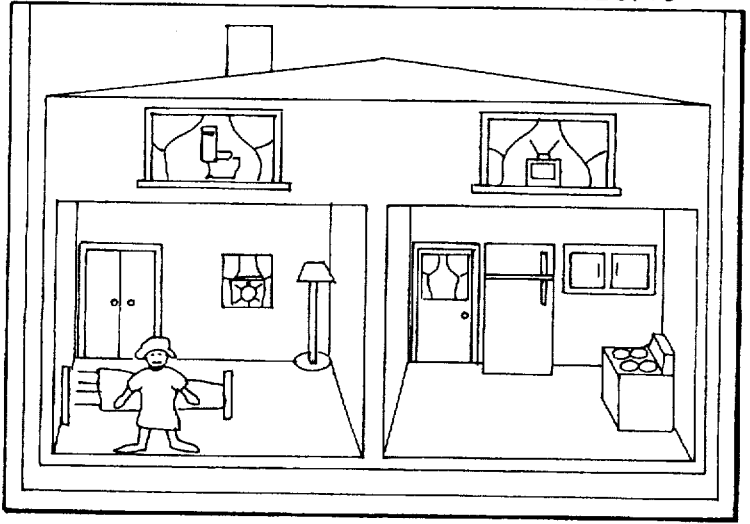

Continuing with the present example play session, there are now several selectable objects in the bedroom, including the doll, the bed, the lamp and the closet. During the object selection step 100, the CPU 44 will successively highlight the doll, the bed, the lamp, and the closet, and dwell on each object for a sufficient interval to allow the user to operate the selector in order to proceed through step 102 to step 104. For example, if the user selects the dark lamp object or the unmade bed object, the CPU 44 will advance through the event loop to step 112, since these objects are neither dolls nor moveable objects, but they are activatable objects. The ON_SELECT action of an activatable object is defined to change the state of the object or perform action (step 114), to change the environment in which the object is located (step 116), or to change the state of another object (step 118). In the present example, the ON_SELECT action of either the darkened lamp or the unmade bed is defined to change the state of the selected object by replacing the image of the object with a lighted lamp or a made bed, respectively. Hence, selection of either the lamp or the bed will cause the CPU 44 to progress to step 114, perform the defined change of state or substitution of objects, and then proceed to step 110. After having activated the unmade bed and then the lamp, the screen display will be as shown in FIG. 6, wherein the bed is made and the lamp is lighted.

The next action desired by the user may be for the doll to go to the bathroom. Therefore, during the next object selection cycle, the user will select the doll. When using a selection device such as a mouse to select objects, the doll is selected by clicking on the image of the doll. Then, in step 106, the CPU 44 generates an outline image of the doll which can be moved to the desired location within the present room, or to the icon image of one of the other rooms, in this instance, the bathroom.

When the selection device is a binary switch, then a scan procedure for designating the desired movement of the doll is executed by selecting the doll during step 100 as described above. In step 106, the CPU 44 generates an outline image of the doll surrounded by several directional icons, such as arrows. In order to allow the user to specify a direction for movement, the CPU successively scans or highlights the directional arrows and the doll outline during the scan procedure so that the user may select a desired direction by operating the switch during the time interval that the corresponding directional arrow is highlighted. The outline image of the doll is then moved by a predetermined distance increment. When the outline image has been moved to the desired location, the user may then operate the selector switch when the doll outline image is highlighted by the system, in order to effect relocation of the doll image to the desired location within the displayed environment.

There are two possibilities for the resulting action of the CPU 44 after doll movement has been specified. The image of the doll may be moved to a different location within the present room (step 120), or the doll may be moved to a different room (step 108). In the first case, movement of the doll is effected in step 120 by re-drawing the image of the doll at the specified location in the room. If the doll is moved to another room, then the CPU proceeds through the event loop to step 108 in order to perform a procedure for changing the environment of the doll.

As part of a directed learning process, various rules may be invoked to prevent a desired movement of the doll from one room to another unless predetermined conditions have been satisfied. Such rules or a series of such rules may be optionally invoked at the beginning of a play session as one of the initial parameters to enable a play session to be conducted at a higher cognitive level. For example, an optional rule may require that the bed be made before permitting the doll to be moved from the bedroom to another room. Another optional rule may require that the doll be dressed as a precondition to enabling the doll to be moved outside.

Figure 7:
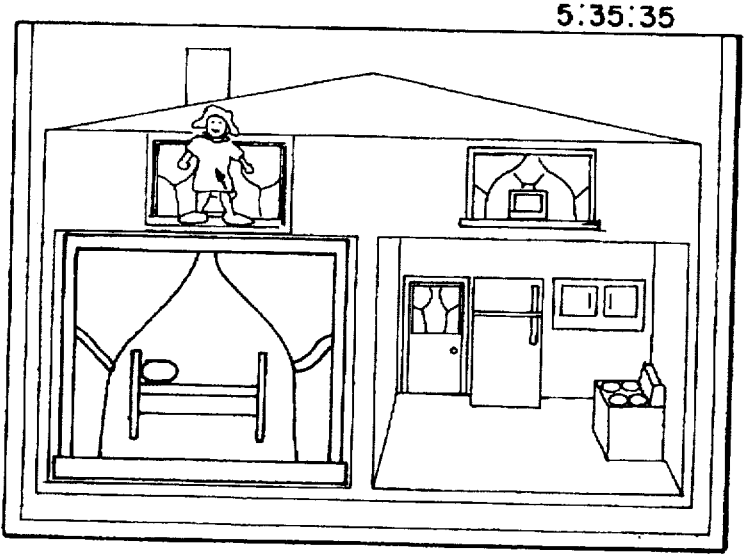
Figure 9:
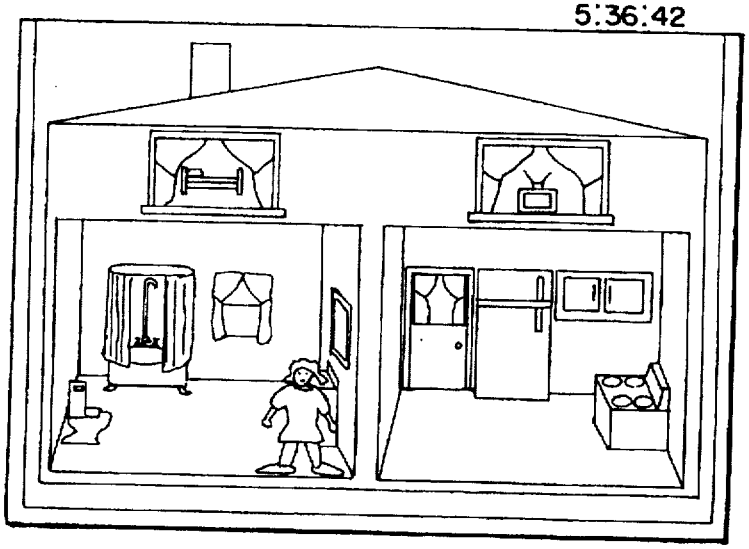

In the present example, when the user desires to move the doll from the bedroom to the bathroom, the image of the doll is moved by the user to the bathroom icon. Then, during step 108 the previously-occupied bedroom image is replaced with a bedroom icon image as shown in FIG. 7. Subsequently, during step 108, the bedroom icon image is replaced with a smaller bedroom icon and the bathroom icon image is preferably rotated into the display position formerly occupied by the bedroom image as shown in FIGS. 8a–d. Finally, the bathroom icon image is replaced with an image of the interior of the bathroom and the objects contained therein as shown in FIG. 9.

Among the objects within the bathroom is a toilet object, which is defined as a furniture object, and further has an activatable attribute. For example, the toilet object may be defined to have an ON_SELECT action of causing the CPU 44 to retrieve a digital audio recording of the sound of a toilet flushing, and to play the recording through the speaker during step 114.

Figure 10:
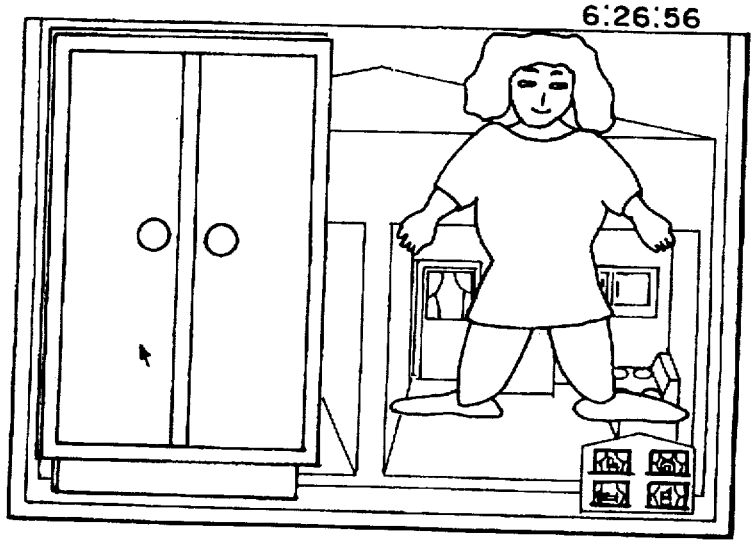
Figure 8A:
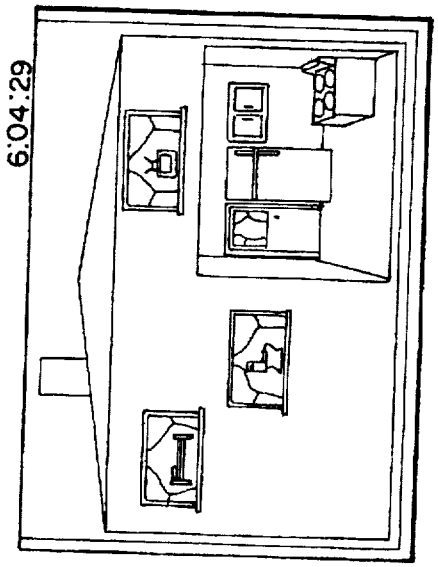
Figure 8B:
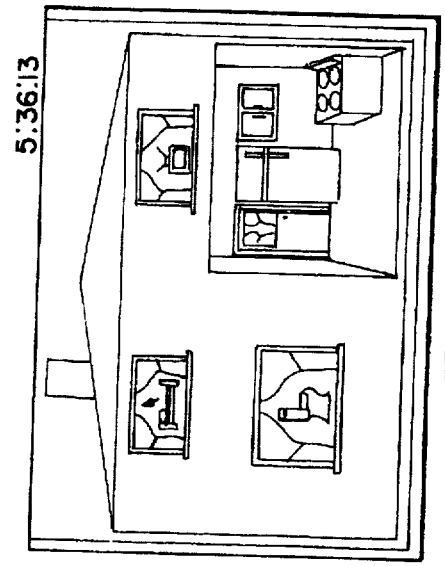
Figure 8C:
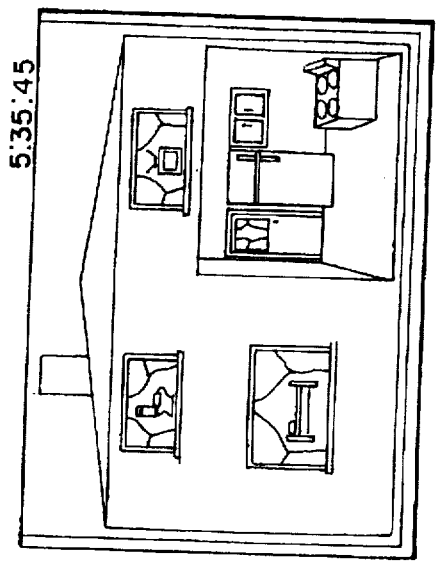
Figure 8D:
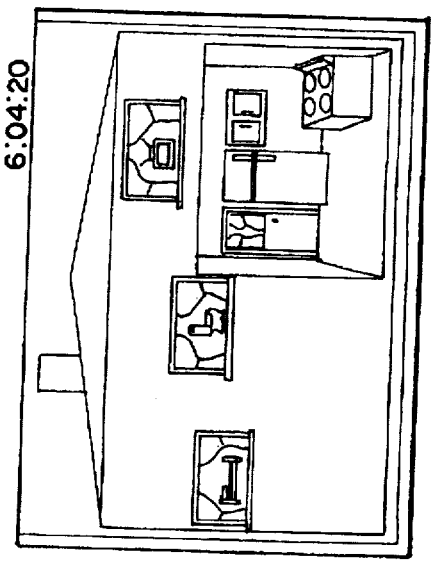

Some objects are defined to have an ON_SELECT action of altering the environment of the doll. It is desirable to provide enlarged images of objects that may interact with the doll in a complex manner. For example, the closet may be defined as storing a number of clothing items or the like that can be bound to the doll. If the closet is selected in step 100 while the doll is in the bedroom, then the CPU 44 proceeds to step 116 to change the environment of the doll by producing enlarged images of the doll and the closet, as shown in FIG. 10. Also during step 116, an icon image of the doll house is provided on the display for allowing the user to return to the bedroom scene or to another room scene. If the user subsequently selects the closet, then the closet opens to reveal images of the objects that are initially defined as being stored within the closet, as shown in FIG. 11.

Figure 11:
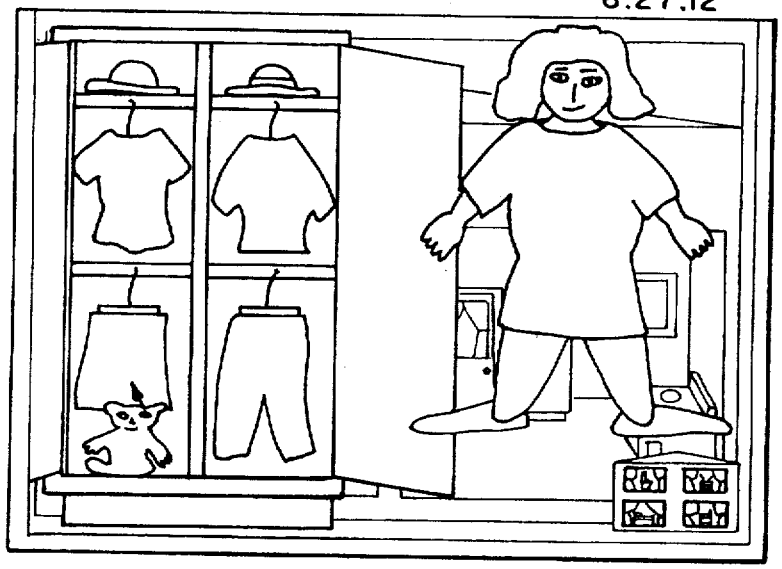

While the closet in FIG. 11 is open, the object selection procedure 100 causes the CPU 44 to successively highlight the house icon and the images of the objects in the closet. In this manner the user is permitted to return to the house or to select an object from the closet for binding to the doll object. For example, if the user selects the white shirt, then the CPU will determine that, as a clothing object, the white shirt is a moveable and bindable object. In step 122 the system identifies available binding sites for the white shirt, for example the torso of the doll image. Then, the CPU proceeds to step 124 to permit the user to effect movement of the selected clothing object to the doll. Such movement may be effected by the use of a mouse, or by incrementally moving the clothing object toward the doll by a cyclic directional selection procedure as discussed above. Alternatively, the system may be initially configured to effect automatic movement of a bindable object to a compatible binding site while allowing the user to select among multiple available binding sites in the then present environment. When the selected bindable object has been moved to the desired binding site, or within a predetermined distance from the binding site, the CPU proceeds to step 126.

In step 126, appropriate status variables in the selected object's definition are updated to reflect that the object is bound to another object, and the image of the selected object is thereafter connected to the image of the object to which it has been bound. If, upon approaching the desired binding site, it is determined that another object is already bound at the desired binding site, an operational rule is invoked whereby the previously bound object is exchanged with the selected object. For example, if the white shirt is selected, but the doll is already wearing the red shirt, then the red shirt will be returned to its initial storage location in the closet when the white shirt is bound to the doll.

Figure 12:
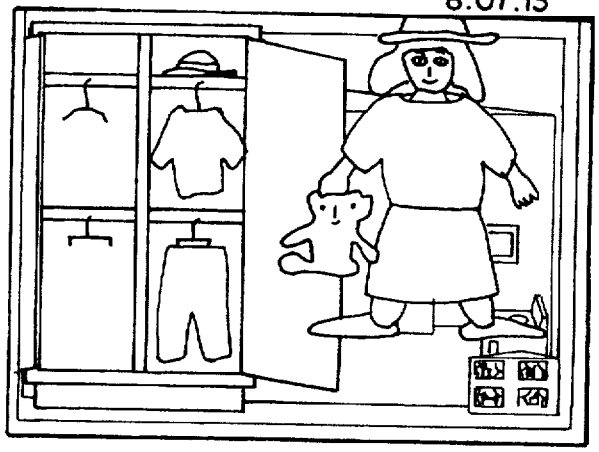

In addition to clothing objects, miscellaneous objects can be stored in the closet, for example, a teddy bear or other toy object. The doll object can be defined to have a binding site at the doll's hand for the teddy bear, so that selection, movement, and binding of the teddy bear will result in the image of the doll holding the teddy bear, as shown in FIG. 12. After the user has dressed and accessorized the doll in the desired manner, then selection of the house icon can be used to effect a return of the doll to the bedroom scene.

Figure 13:
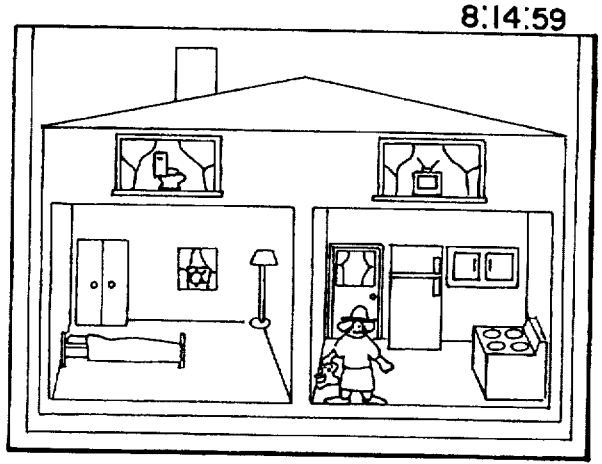
Figure 14A:
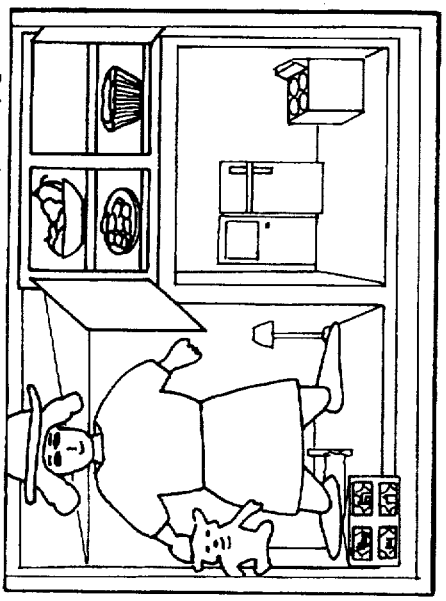
Figure 14B:
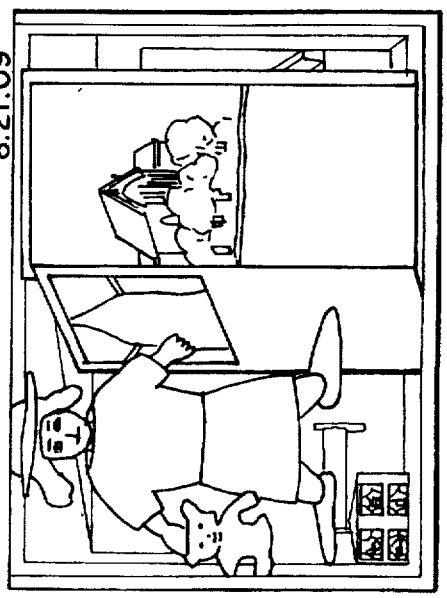

Referring now to FIG. 13, the doll is shown to be located in the kitchen. In the kitchen, there is a refrigerator and a cupboard, which are defined to store food objects. As shown in FIGS. 14A and 14B, food objects may be selected from the refrigerator and/or the cupboard in an enlarged image environment such as discussed above in connection with the closet. After obtaining one or more food objects from the refrigerator or the cupboard, the user may return the doll to the kitchen environment and select the stove object for cooking the food.

Figure 15:
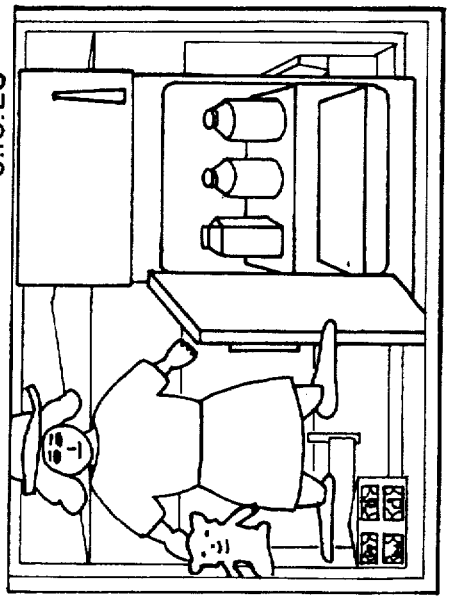

Referring now to FIG. 15, the doll is shown in the displayed environment for interacting with the stove. The stove is defined as having binding sites for food objects, e.g., upon the burners or within the oven. As an optional play procedure, the stove may be actuated to cook food. For example, after the user has bound a food object to an appropriate binding site on the stove, an ON_SELECT action of the stove may be activated by selecting the controls for the stove. Then, in step 112, the CPU further determines that the ON_SELECT action of the stove is defined to alter the state of an object bound to the stove and proceeds to step 118. In step 118, the object definition of an initially raw food item can be altered to replace the image of the raw food item with an image of a cooked food item. The cooked food item may then be bound to the doll (e.g., to the doll's hand) and the user may return the doll to the kitchen scene.

Figure 16:
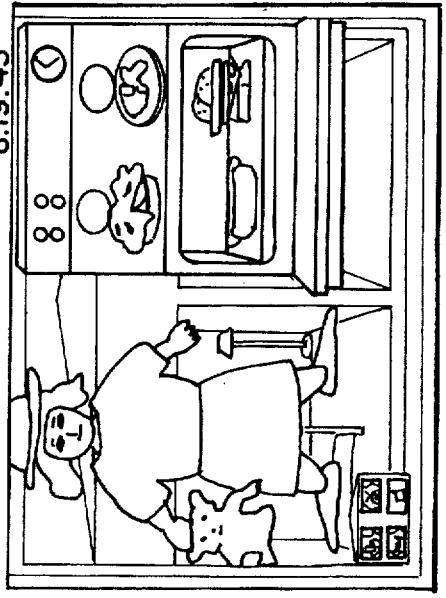

The ON_SELECT action of some objects can be defined to cause the CPU to display a recorded or live digital image of a real-world scene. For example, the door object shown in the kitchen may be defined to display a digitized image of a real world scene, as shown in FIG. 16. In a similar manner, a mirror object can be defined in another room to provide an ON SELECT action of causing the CPU to obtain a real-time video image of the user from the video camera 38 and to display the video image within the boundary of the mirror object in the appropriate room scene.

As has been noted, the CPU 44 maintains a chronological record of selected objects and actions taken during a play session. After the play session is ended, a printed or electronic copy of the record may be provided to diagnostic personnel for evaluation of the complexity of play or to maintain a record of increasing cognitive sophistication over a number of play sessions. Alternatively, the progress of the play session may be communicated in real time to diagnostic personnel via a network interface 53 connected with the CPU 44 in lieu of or in addition to maintaining the chronological record of the session. In a further embodiment of the system according to this invention, the network interface functions to link the system to one or more similarly-configured, but remotely located, systems to enable two or more disabled users to interact in the same play environment. In such an embodiment, the selected objects and actions would be communicated via the network interface in order to maintain a consistent status of the virtual play environment presented by the remote systems to the respective users.

The terms and expressions which have been employed are used as terms of description and not of limitation. There is no intention in the use of such terms and expressions of excluding any equivalents of the features shown and described or portions thereof. It is recognized, however, that various modifications are possible within the scope of the invention as claimed.

What is claimed is:

1. A system for providing a virtual play environment, comprising:

a central processing unit;

a selection device connected with the central processing unit;

a computer memory connected with the central processing unit for storing object definitions and operational rules, each object definition including a plurality of attributes, including:

an encoded visual image of a physical object;
    a binding variable for indicating whether the object is bindable to a second object;
    a moveability variable for indicating whether the object is moveable within the play environment;
    a selectability variable for indicating whether the object is selectable for an activity; and
    instructions defining an action procedure to be followed by the central processing unit when the object is selected; and the operational rules defining a sequence of steps to be performed by the central processing unit to effect actions of defined objects in response to the selection device; and a visual display device connected with the central processing unit for displaying a visual image of a defined object and the actions of the defined object when the defined object is selected by the user.

* * * * *